United States Patent

[11] 3,572,928

| [72] | Inventors | John A. Decker, Jr.<br>Concord, Mass.;<br>Martin O. Harwit, Ithaca, N.Y.; Melvyn G. Morris, Sharon, Mass. |
|---|---|---|
| [21] | Appl. No. | 825,741 |
| [22] | Filed | May 19, 1969 |
| [45] | Patented | Mar. 30, 1971 |
| [73] | Assignee | Comstock & Wescott, Inc.<br>Cambridge, Mass. |

[54] AIRCRAFT PROXIMITY WARNING SYSTEM
11 Claims, 6 Drawing Figs.

[52] U.S. Cl.................................................. 356/4,
250/83.3, 343/112
[51] Int. Cl........................................ G08g 5/04,
G01c 3/08
[50] Field of Search............................................ 343/112.4;
356/4, 5; 250/83.3, 106

*Primary Examiner*—Rodney D. Bennett, Jr.
*Assistant Examiner*—Stephen Buczinski
*Attorney*—Roberts, Cushman and Grover ABSTRACT: An airborne system to be carried by each protected aircraft includes a pulsed, infrared emitting xenon flash lamp and a photoelectric circuit for sensing the flashes from other, target aircraft controlling an alarm or display. The photocell is IR filtered to discriminate against light sources low in IR. The sensing circuits discriminate against light from steady and intermittent sources other than the xenon lamp. Reflections of flashes from the protected craft's lamp are rejected by blocking the sensing circuit during the duration of the lamp flash, and to avoid coincidence of the protected and target craft flashes the flash repetition is randomly varied about the mean rate. An array of photoelectric cells viewing different zones ahead of the protected aircraft controls a visual display indicating the location and range of target aircraft.

Patented March 30, 1971 3,572,928

Inventors
John A. Decker, Jr.
Martin O. Harwit
Melvyn G. Morris
by Roberts, Cushman & Grover
Att'ys

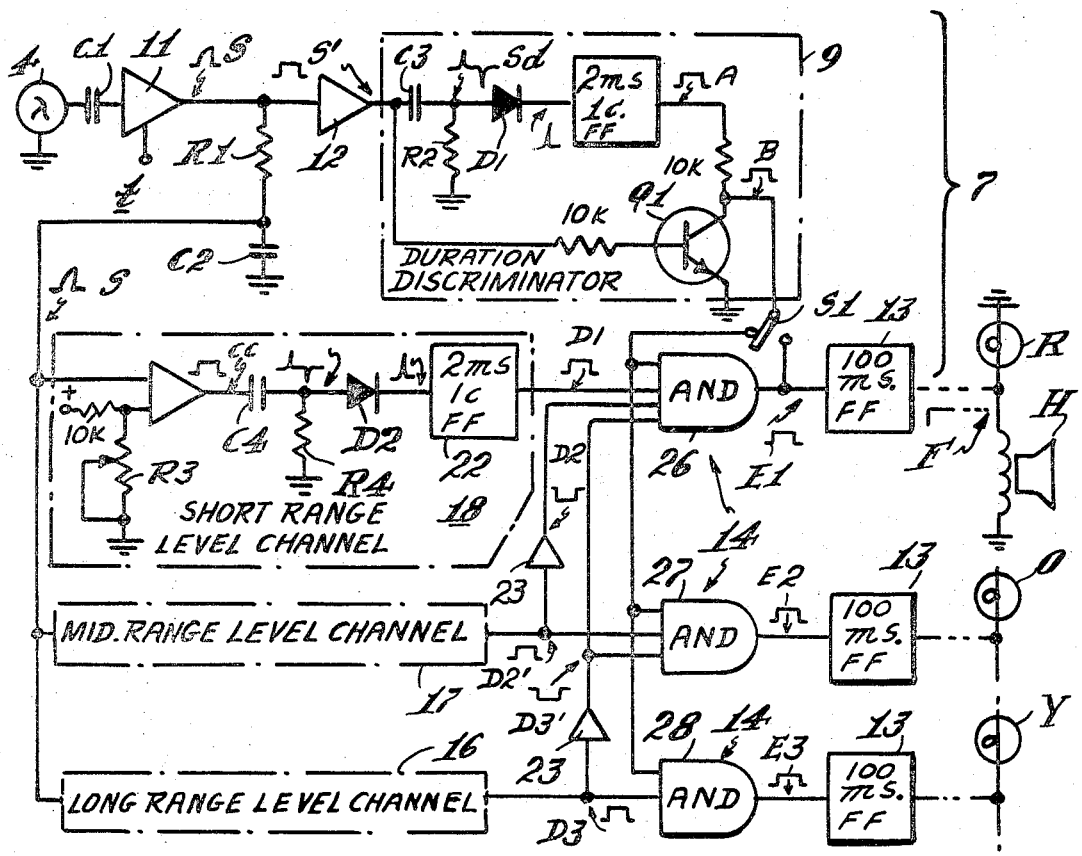
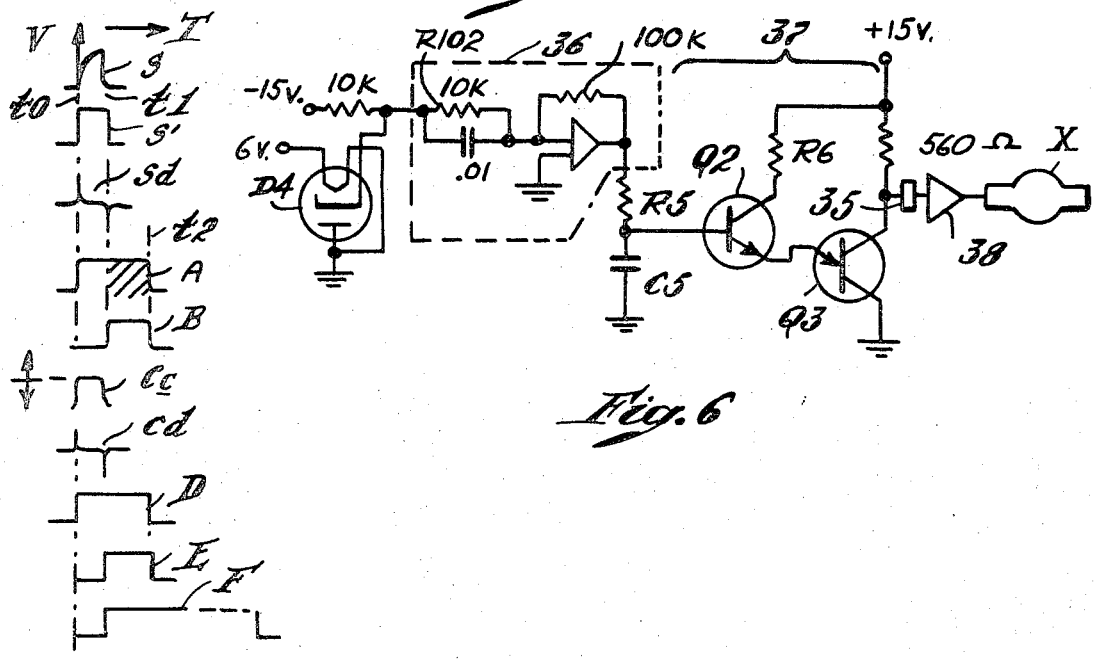
Fig. 5
Fig. 6

AIRCRAFT PROXIMITY WARNING SYSTEM

BACKGROUND OF THE INVENTION

There is a well publicized need, particularly near airports, for low-cost airborne equipment which will warn a pilot of the proximity of other aircraft so that he may avoid a collision or near-collision. Ground-based systems, while theoretically superior, require on every plane including a one-passenger craft, a minimum of electronic sets such as two-way radio, radar beacon transponder, and omnirange as to be economically and politically prohibitive. A single, wholly airborne system would reduce the equipment cost and the need for ground control personnel, now desperately overburdened with commercial operations.

Thus the object of the present invention is to provide an airborne collision avoidance system within the means of the small plane private owner.

SUMMARY OF THE INVENTION

According to the invention aircraft proximity detection apparatus airborne on craft carrying a short rise time flash lamp pulsed for a predetermined interval comprises a plurality of photoelectric means responsive to light to produce photoelectric signals following the appearance and duration of the light, a plurality of proximity alarm devices and a corresponding plurality of electronic circuits interconnecting the respective photoelectric means and devices, each circuit including frequency selective means with a characteristic response only to short rise time signals of duration substantially the same as said predetermined interval, said response actuating an alarm device such that steady light and intermittent light of longer duration than said lamp flash are rejected by said circuits, and respective alarms are actuated only by response of a corresponding circuit to lamp flashes from another aircraft, said devices being disposed to view in different directions, and respective alarms being arranged in a corresponding disposition, thereby to indicate both the proximity and direction of the other aircraft.

THE DRAWINGS

For the purpose of illustration typical embodiments of the invention are shown in the accompanying drawings in which:

FIG. 4 is a schematic diagram of a discriminator circuit;

FIG. 5 is a graph showing voltage waveforms in the circuit of FIG. 4; and

FIG. 6 is schematic diagram of a flash lamp pulse generator circuit.

Proximity Warning System in General

(FIG. 1)

Figure 1:
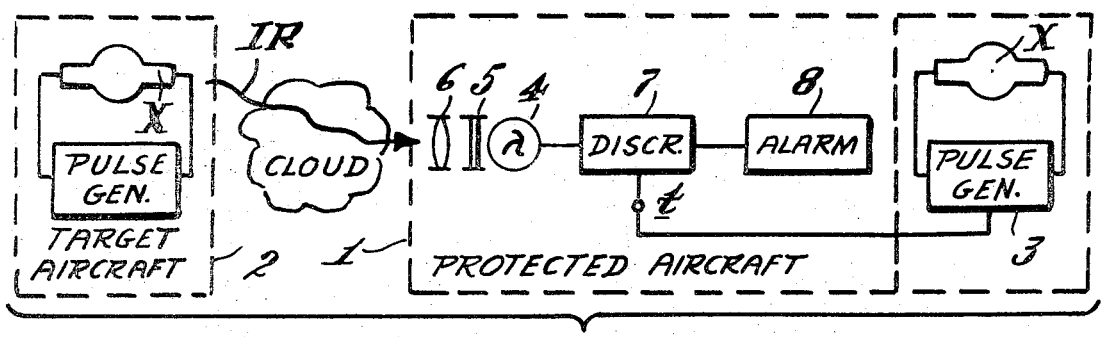
FIG. 1 is a block diagram of aircraft proximity detection apparatus.
Figure 2:
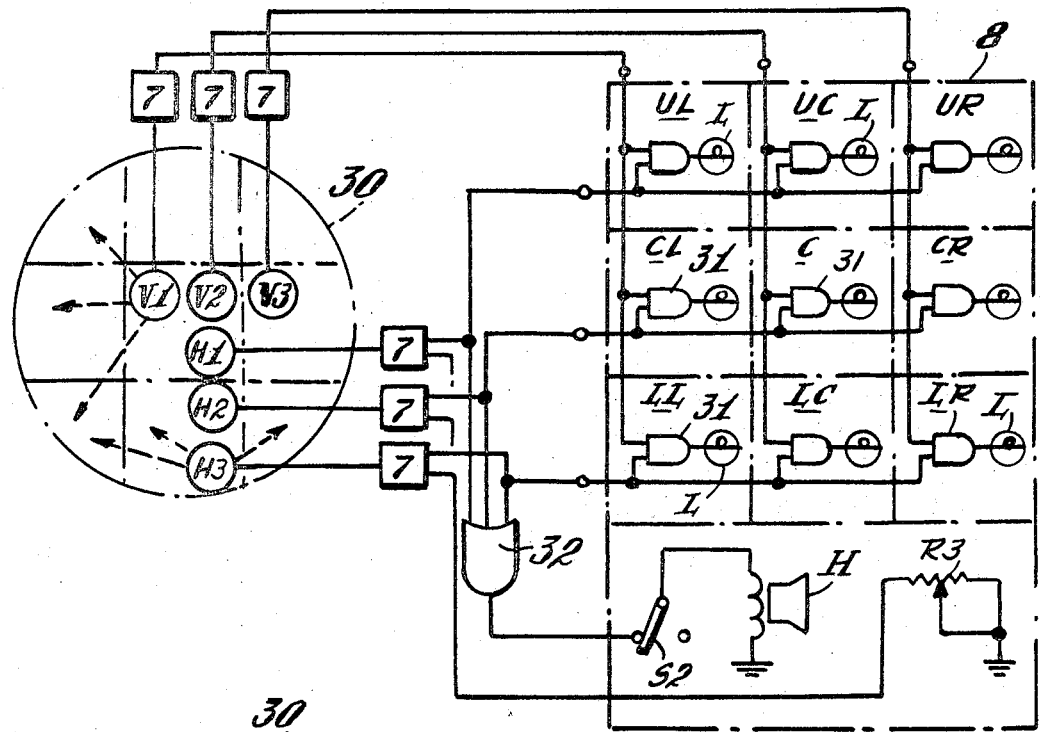
FIG. 2 is a schematic diagram showing a photocell array, alarm display of the apparatus and connecting circuit.

The proximity detection system of FIG. 1 comprises, on both the protected aircraft 1 and a target aircraft 2, a xenon flash lamp X, typically a 10 kilowatt, 10 watt-sec., lamp such as E.G. G. type LS-81. The lamp is preferably located on the upper tip of the aircraft tail and is flashed for approximately 1 millisecond (msec.) at 1 second intervals by a pulse generator shown in detail in FIG. 6. Each aircraft also carries one or more infrared photodetector cells 4, either photovoltaic or photoconductive, disposed at the leading edge of the wing tip; for example, to view a region ahead of the craft determined by a lens 6. Each cell detects the xenon flash and produces electrical pulses of corresponding duration and repetition rate. The pulses are amplified by a pulse discriminating circuit 7, such as is shown in FIG. 4, and applied to an alarm 8 which may be an audible device, such as a horn, or a visual display, or a combination of audible and visual alarm as shown in FIGS. 2 and 4.

A large number of different types of extraneous light sources can actuate the photocell and must be rejected by the system. There are continuous light sources such as the sun and moon, and ground sources such as lights and signs which, however, may be turned on rapidly similarly to a flash, and there are brief reflections of the solar and ground sources. Solar radiation is rejected by using a flash lamp X with high infrared emission an covering the photocell with an infrared transmission filter 5. A xenon flash lamp of the type described has an emission of about one-third of its total emitted energy in the infrared wavelength band between 0.8 and 1.0 microns, whereas the only one-tenth of the sun's emission energy lies in this wavelength range. Substantial solar rejection is therefore obtained with an 0.8 to 1.0 micron band-pass transmission filter. Although considerable visible light is blocked, the remaining infrared light has far greater transmission through atmospheric haze and the immunity of the system from atmospheric conditions is actually improved by passing only infrared radiation to the photocell. Moreover this rejected radiation is outside the range of the photocell selected, according to the present invention, to match spectrally the emission of the flash lamp.

Duration Discriminator (FIG. 4)

Further rejection of extraneous light sources is accomplished by the discriminator circuit 7, one form of which is shown in FIG. 4. Waveforms of voltages in this circuit are shown in FIG. 5. The xenon flash from a target aircraft as well as strong light from the various solar or ground sources and their reflections are detected by the photocell 4 and applied through an 0.01 microfarad capacitor C1 to a preamplifier 11. The capacitor C1 largely rejects direct current signals such as continuous solar or ground light, but passes the 1 millisecond pulse S produced by the target xenon lamp as well as signals resulting from reflections and ground source flash-ons having a fast initial rise time. The preamplified signals are then applied to a conventional squaring amplifier 12 which amplifies and clips the signals reshaping the flash pulse into form S'. A filter network including a 10 kilohm resistor R1 and an 0.01 microfarad capacitor C2 greatly attenuates extremely brief (much less than one millisecond) voltage pulses, thus suppressing transient spikes.

Following the squaring amplifier the duration discriminator 9 comprises a differentiating network including an 0.001 capacitor C3 and a 100 kilohm resistor R2 which pass positive and negative pulses Sd at the time t0 of the leading edge and time t1 of the trailing edge of the squared pulse S'. The positive pulse only is conducted by a diode D1 to the input of a conventional monostable multivibrator or one-cycle flip-flop which produces a single square wave A beginning at time t0 and ending at time t2 after 2 milliseconds duration determined by time constant network of the flip-flop. The 2 millisecond duration voltage pulse is applied to the collector of a duration comparison amplifier Q1 (type 2N2484 transistor), the output level of the flip-flop being selected such that any 2 millisecond duration signal pulse provides a voltage level appropriate to a B+ supply for the transistor Q1, for example 3 to 28 volts. The squared 1 millisecond xenon flash pulse S' and any solar, ground or reflected light signals passed by the squaring amplifier 12 are also applied through a 10 kilohm coupling resistor to the base of the transistor Q1.

The duration comparison amplifier may then have several combinations of voltages applied to its base and collector as follows:

1. In the absence of any signal voltage there will be neither a 2 msec. duration voltage at the collector nor a 1 msec. or greater duration voltage at its base, in which case there will be no output at the collector;

2. In the presence of a pulse of 2 msec. length or longer, as from solar, ground or reflected light, there will be the 2 msec. voltage at the collector, and an overlapping voltage of 2 msec. or longer at the base. The transistor Q1 will be conducting to saturation throughout or beyond the 2 msec. period, the voltage at its collector will be essentially that of its grounded emitter producing no useable output;

3. In the presence of a xenon pulse S' of less than 2 msec., the collector will be grounded with no output for the approximately 1 msec. length of the pulse, but will rise to the B+ level of the voltage A for the remainder of the 2 msec. period (t1—t2, shown shaded in waveform A of FIG. 5), producing an output pulse B for that period. The remainder pulse B produced only by the 1 msec. flash from a xenon flash lamp represents the rejection of the aforementioned extraneous fast rise time light sources, and the presence of a target aircraft.

The duration discriminator circuit 9 in combination with its input including the DC filtering capacitor C1 comprises a rejection circuit with a characteristic response only to signals of short rise time, i.e., much less than the predetermined millisecond interval of the target aircraft flash lamp and of substantially the same duration as said predetermined interval.

The remainder pulse B from the duration discriminator circuit 9 may be applied directly to an alarm device such as a lamp R or an audible horn H, but preferably is used to trigger an alarm power supply. As shown in FIG. 4 a switch S1 may directly connect the emitter of transistor Q1 to a 100 millisecond flip-flop 13 whose output F energizes either the lamp R or horn H for one-tenth second each second, thus giving a visual or audible alarm of the presence of a target aircraft whose xenon lamp is within the range of the protected aircraft's photocell. As previously suggested, the target aircraft xenon flash lamp is pulsed repeatedly about once per second so that the repeated flashing or sounding of the alarm each second further selectively indicates a nearby aircraft.

Target Range Indication (FIG. 4)

The system shown in FIG. 4 is adapted to indicate the relative range of target aircraft with the switch S1 omitted as in its open position as shown. In this case the remainder signal B from the duration discriminator 9 is applied to each of three AND or coincidence gates 14. Also applied to the AND gates are the outputs of three level channels 16, 17 and 18.

The three level channels are substantially identical and each receives as its input the preamplified flash signal S coupled through the spike suppressor R1-C2. The amplitude of the flash signal depends on the distance or range of the lamp from which it was emitted, signals from a longer range being lower in amplitude. The signal is applied to an amplitude level detector 21 such as a Fairchild type uA710 Comparator, which indicates by changing its output voltage when the input signal level is above a level determined by its bias resistor R3. The biases for the channels 16, 17 and 18 are set progressively higher so that channel 16 will detect low amplitude level signals from a long target range, channel 18 will detect strong signals from close target range, and channel 17 will detect intermediate signals from intermediate ranges. Typical bias resistor values are 0 to 5 kilohms for channel 16, 6.8 kilohms for channel 17, and 10 kilohms for channel 18, corresponding to ranges at approximately ½ 2 and 5 miles, respectively. Preferably the bias resistor R3 for the long range channel is made manually adjustable so that its bias may be increased to block out long range signals when flying in crowded areas near airports where detection of distant aircraft might interfere with the detection of potentially more dangerously close aircraft.

In each level channel the clipped pulse output Cc from the level detector is differentiated by a 100 kilohm resistor R4 and an 0.001 microfarad capacitor C4. The positive spike of the differentiated pulse Cd is passed by a diode D2 to trigger a 2 millisecond one-cycle flip-flop 22. The 2 millisecond pulses D1—D3 from the multivibrators 22 are directly applied respectively to coincidence gates 26, 27 and 28. Also the remainder pulse B from the previously described discriminator circuit 9 is applied to the three gates. As to the remainder pulse B and the directly applied range pulses D1—D3 the gates act normally as coincidence gates. In addition the level pulses of channels 17 and 18 are inverted in amplifiers 23, the inverted level pulse D3' being applied to gates 26 and 27, and inverted pulse D2' being applied to gate 26, as to which gates they act as inhibiting pulses. Consequently gate 26 will have an output pulse only on coincidence of remainder pulse B and short range level pulse D1 and absence of medium or long range level pulses. Similar gate 27 detects only medium range level pulses D2 and gate 28 detects only long range pulses D3. Thus, for example, a high amplitude, short range xenon flash pulse will pass only the short range gate 26.

The gated level pulses E1, E2 and E3, when presented, trigger the respective 100 millisecond flip-flops 13 from any one of which a 100 millisecond pulse F can energize an audible alarm H, and each of which energizes a distinctive visual alarm such as yellow, orange, and red lamps Y, O and R. Lighting of the yellow lamp, for example, indicates a target aircraft at long range. Lighting of two or three of the lamps indicates separate targets at the corresponding ranges.

The discrimination circuit 7 thus may include the frequency selective capacitor C1 and spike suppressor R1-C2, the duration discriminator 9, and the range level selective channels 16, 17 and 18.

Figure 3:
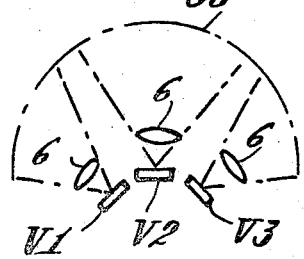
FIG. 3 is an optical diagram of a photocell array.

Target Direction Display (FIGS. 2 and 3)

In addition to the target range indication described above, the system of FIG. 1 may incorporate a visual display of the directional location of one or more detected target aircraft. For example, as shown at the left of FIG. 2, the hemisphere 30 ahead of the protected aircraft may be divided into nine sectors of three horizontal and three vertical sets viewed respectively by photocells H1 to H3 and V1 to V3. Cell V1, for example, is preceded by a lens 6 which restricts its field of view to the three left sectors of the hemisphere. The field of view of cell H3 is similarly limited to the lower three sectors, both cell V1 and cell H3 viewing the lower left sector. Display 8 has nine panels corresponding to the nine sectors, viz, upper left (UL), center (UC) and right (UR), center left (CL), center (C) and right (CR) and lower left (LL), center (LC) and right (LR). In each panel is one lamp L, or three lamps Y, O and R if the display of FIG. 2 is combined with the range channels of FIG. 4.

The cells are connected to the display lamps by discriminator circuits 7 through AND gates 31. Each of the vertical cells V1 to V3 feeds detected target, 100 millisecond pulses to the AND gates of the corresponding vertical set of display panels. For example, cell V1 feeds panels UL, CL and LL; cell H3 feeds panels LL, LC and LR. Thus if, both cells V1 and H3 detect a target in the lower left sector of hemisphere 30, target pulses from both will be fed from both cells to the AND gate 31 in the LL panel, and by the coincidence of the two pulses the gate will pass a 100 millisecond energizing pulse to the connected lamp L. Only when two cells, one in set U1–U3 and one in set H1–H3, view a target in a sector is a lamp lit in a corresponding panel. Thus nine targets can appear in the nine sectors and be displayed without confusion. And up to 27 targets may be displayed in the nine panels at the three different ranges.

It should be cautioned, that although range and direction indicators are displayed, they are primarily to alert the pilot of the protected aircraft of the existence of intruding target aircraft to the need for visually locating it, and are only an aid in showing him where to locate it.

Either set of three cells may also feed the audible alarm H through an OR gate 32 and a manual switch S2 which may be opened when the protected aircraft is in a congested area. One or more range adjusting resistors R3 may control the discriminators 7 of a set as described under Target Range Indication.

Xenon Lamp Pulse Generator

Discrimination must be made against reflection back to a protected aircraft of its own xenon lamp flashes. As indicated in FIGS. 1 and 4 this may be accomplished by connecting the pulse generator 3 for the lamp to an input terminal $t$ to the discriminator 7, preferably as shown in FIG. 4 to a blocking terminal of the preamplifier 11 so as to disable the preamplifier and the rest of the system for the duration of the flash pulse of the protected aircraft. However, there is a possibility that a target aircraft may be flashing at the same rate, and its successive flashes might be received in periods overlapping the flashing or blocking of the protected aircraft system. To reduce the possibility to negligible proportions a special xenon lamp pulse generator is provided.

As shown in FIG. 6, the pulse generator comprises an operational amplifier 36 serving as a power supply for a 1 millisecond pulse unijunction oscillator 37 with a 1 second repetition rate. The power supply of —15 volts for the operational amplifier is modulated by a noise or random voltage source such as a temperature limited vacuum diode D4 (type 6AL5) coupled to the operational amplifier by a 10 kilohm resistor R102 and 0.01 microfarad capacitor. The diode cathode noise output consists of random voltage transients of both polarities. The output of the operational amplifier is a relatively steady DC voltage on which is superimposed the diode noise in amplitude sufficient to exceed or diminish the DC level substantially. This noise modulated voltage is applied to a time constant network comprising a resistor R5 (1 megohm) and capacitor C2 (1 microfarad) having a common junction connection to the base of a transistor Q2 of type 2N2484. The time constant network R5–C5, the transistor Q2 and a unijunction transistor Q3 (2N2840) comprise a pulse oscillator controlling a 1 msec., one cycle flip-flop 35 and a power amplifier 38. The time constant network tends to charge at a rate of about once per second. The transistor Q2 is an emitter follower through which the unijunction transistor discharges the time constant network when the voltage at its emitter rises to a triggering voltage determined by its positive supply +15 v. and the unijunction transistor characteristics. This threshold potential would, in the absence of the noise source D1, be reached at regular 1 second intervals. But, with the noise source transients superimposed on the DC supply voltage —1515 the trigger voltage may be advanced or delayed such that the unijunction transistor is triggered 10 to 25 milliseconds before or after the normal period of the time constant network. When triggered the unijunction transistor conducts only briefly and produces an output pulse of about 50 microseconds duration. This 50 microsecond pulse triggers a monostable multivibrator 35 whose output causes the lamp drive 38 to pulse the lamp X with a 1 millisecond pulse approximately once per second with the desired variation of 20 to 50 milliseconds about 1 second.

It should be understood that the present disclosure is for the purpose of illustration only and that this invention includes all modifications and equivalents which fall within the scope of the appended claims.

We claim:

1. Aircraft proximity detection apparatus airborne on craft carrying a short rise time flash lamp pulsed for predetermined interval, comprising:
    a plurality of photoelectric means responsive to light to produce photoelectric signals following the appearance and duration of the light;
    a plurality of proximity alarm devices;
    a corresponding plurality of electronic circuits interconnecting respective photoelectric means and devices, each circuit including frequency selective means with a characteristic response only to short rise time signals of duration substantially the same as the predetermined interval of said lamp flash, said response actuating an alarm device such that steady light and intermittent light of longer duration than said lamp flash are rejected by said circuits, and respective alarms are actuated only by response of a corresponding circuit to light flashes from another aircraft; and
    said devices being disposed to view in different directions, and respective alarms being arranged in a corresponding disposition thereby to indicate both the proximity and direction of the other aircraft.

2. Apparatus according to claim 1 wherein each said electronic circuit includes a monostable oscillator connected to and triggered by said frequency selective means to supply power to its respective alarm device and including timing means limiting the period of said power supply to a fraction of the interval between lamp flashes.

3. Apparatus according to claim 1 wherein said frequency responsive means comprises a single shot flip-flop coupled to said photoelectric means and responsive to an electric signal produced to generate a pulse of the same order of length as said predetermined interval, a gating valve connected between the flip-flop and said alarm, and a second connection to said valve from said photoelectric means, said valve being responsive only to the application of said photoelectric signal during the interval of said generated pulse to actuate said alarm device.

4. Apparatus according to claim 1 characterized by a flash lamp, a pulse generator for flashing said lamp at an average repetition rate and including means randomly to vary the occurrence of successive pulses about said average rate.

5. Apparatus according to claim 4 characterized by a connection between said pulse generator and each said electric circuit for rendering said circuit nonresponsive during each pulse.

6. Apparatus according to claim 1 characterized by a plurality of alarms for each photoelectric means, each said electronic circuit for each photoelectric means including a plurality of coincidence gates each connected between said frequency selective means and a respective alarm, and a plurality of range channels each connected between said photoelectric means and respective gates, said range channels including threshold detectors of electric signals of different amplitude, and said gates being responsive respectively to the coincidence of said frequency selective means response and threshold signals of different amplitude to actuate different alarms, thereby to indicate the range of the other aircraft.

7. Aircraft proximity detection apparatus airborne on each aircraft comprising:
    a short rise time flash lamp pulsed for predetermined interval;
    a pulse generator for flashing said lamp at an average repetition rate including means randomly to vary the occurrence of successive pulses about said average rate;
    photoelectric means responsive to light to produce a photoelectric signal following the appearance and duration of the light;
    a proximity alarm device;
    an electronic circuit interconnecting the photoelectric means and device including frequency selective means with a characteristic response only to short rise time signals of duration substantially the same as said predetermined interval, said response actuating said alarm device;
    whereby steady light and intermittent light of longer duration than said lamp flash are rejected by said circuit and said alarm is actuated only by response of said circuit to lamp flashed from another aircraft, thereby to indicate the proximity of said other aircraft; and
    said random pulse generator varying the flash rates of respective aircraft lamps thereby to reduce to negligible portions the possibility of coincidence of successive lamp flashes on different aircraft.

8. Apparatus according to claim 7 characterized by a connection between said pulse generator and electronic circuit for rendering said circuit nonresponsive during each pulse.

9. Aircraft proximity detection apparatus airborne on craft carrying a short rise time flash lamp pulsed for a predetermined interval, comprising;

photoelectric means responsive to light to produce a photoelectric signal following the apparatus and duration of the light;

a proximity alarm device;

an electronic circuit interconnecting the photoelectric means and device including frequency selective means with a characteristic response only to short rise time signals of duration substantially the same as said predetermined interval, said response actuating said alarm device, said electronic circuit including a monostable oscillator connected to and triggered by said frequency selective means to supply power to said alarm device and timing means limiting the period of said power supply to a fraction of the interval between lamp flashes; and whereby steady light an intermittent light of longer duration than said lamp flash are rejected by said circuit and said alarm is actuated only by response of said circuit to lamp flashes from another aircraft, thereby to indicate the proximity of said other aircraft.

10. Apparatus according to claim 9 wherein said frequency responsive means comprises a single shot flip-flop coupled to said photoelectric means and responsive to an electric signal produced thereby to generate a pulse of the same order of length as said predetermined interval, a gating valve connected between the flip-flop and said alarm, and a second connection so said valve from said photoelectric means, said valve being responsive only to the application of said photoelectric signal during the interval of said generated pulse to actuate said alarm device.

11. Apparatus according to claim 9 characterized by a plurality of alarms for each photoelectric means, said electronic circuit including a plurality of coincidence gates each connected between said frequency selective means and a respective alarm, and a plurality of range channels each connected between said photoelectric means and respective gates, said range channels including threshold detectors of electric signals of different amplitude, and said gates being responsive respectively to the coincidence of said frequency selective means response and threshold signals of different amplitude to actuate different alarms, thereby to indicate the range of the other aircraft.